US00RE43304E

(19) United States
(12) Reissued Patent
Zanaletti

(10) Patent Number: US RE43,304 E
(45) Date of Reissued Patent: Apr. 10, 2012

(54) CONTAINER

(75) Inventor: Doriano Zanaletti, Lainate (IT)

(73) Assignee: Perfetti Van Melle S.p.A., Lainate (IT)

(21) Appl. No.: 29/380,705

(22) Filed: Dec. 9, 2010

Related U.S. Patent Documents

Reissue of:
(64) Patent No.: Des. 582,268
Issued: Dec. 9, 2008
Appl. No.: 29/297,490
Filed: Nov. 13, 2007

(30) Foreign Application Priority Data

May 10, 2007 (EM) ..... 000720610

(51) LOC (9) Cl. ..... 09-03
(52) U.S. Cl. ..... D9/422
(58) Field of Classification Search ..... D9/430–433, D9/414–418, 420–429, 560, 737, 756; D3/273, D3/302; 206/421, 454, 457, 775–778, 784, 206/822; 220/500, 523–529, 552, 555; 229/67.3, 229/67.4, 68.1, 100, 103.3, 104–106, 108, 229/108.1, 109, 110, 112, 117.09, 117.12, 229/117.15, 120, 125.015, 160.1, 162.1, 229/182.1, 215, 247, 406, 407, 902, 920, 229/922, 930, 942; D19/26
See application file for complete search history.

(56) References Cited

U.S. PATENT DOCUMENTS

| | | | |
|---|---|---|---|
| 425,188 | A | 4/1890 | Riedell |
| 1,515,901 | A | 11/1924 | Helmquest |
| 1,668,572 | A | 5/1928 | Parmele |
| 1,755,375 | A | 4/1930 | Tanner |
| D110,742 | S | 8/1938 | Wolf |
| 3,315,718 | A | 4/1967 | Berman |
| 3,392,903 | A | 7/1968 | Morgan, Jr. |
| D250,748 | S | 1/1979 | Leger |
| D264,602 | S | 5/1982 | Plutsky |
| 4,334,611 | A | 6/1982 | Watson et al. |
| D265,889 | S | 8/1982 | Lawrence et al. |
| D327,004 | S | 6/1992 | Nadel |
| 5,226,532 | A | 7/1993 | Davidson et al. |
| D387,976 | S | 12/1997 | Mori |
| D388,951 | S | 1/1998 | Mori |
| 5,871,142 | A | 2/1999 | Josephson |
| D445,332 | S | 7/2001 | Breiding et al. |
| D454,303 | S | 3/2002 | Sipinen |
| D465,416 | S | 11/2002 | Dzwill et al. |
| D479,464 | S | 9/2003 | Kopecky |
| D484,046 | S | 12/2003 | Kopecky |
| D489,255 | S | 5/2004 | Kratzert et al. |
| D503,087 | S | 3/2005 | Dzwill et al. |
| D510,813 | S | 10/2005 | Gilman |
| D512,304 | S | 12/2005 | Aldridge |
| 7,159,717 | B2 | 1/2007 | Aldridge et al. |
| 7,325,686 | B2 | 2/2008 | Aldridge |
| 2004/0178252 | A1 | 9/2004 | Stone et al. |
| 2006/0027483 | A1 | 2/2006 | Aldridge |

*Primary Examiner* — Karen S Acker
(74) *Attorney, Agent, or Firm* — Young & Thompson

(57) CLAIM

The ornamental design for a container, as shown.

DESCRIPTION

FIG. 1 is a top, front and *left* side perspective view of a container showing my new design;
FIG. 2 is a front elevational view thereof;
FIG. 3 is a side elevational view thereof from the right of FIG. 2;
FIG. 4 is a top plan view thereof;
FIG. 5 is a rear elevational view thereof; [and.]
FIG. 6 is a bottom plan view thereof*;*
*FIG. 7 is a top, front and left side perspective view of the container of FIG. 1 with its tab removed from the slot;*
*FIG. 8 is a top, front and left side perspective view of the container of FIG. 1 with its flap open; and*
*FIG. 9 is a top, front and left side perspective view of the container of FIG. 1 with its flap open and the container unfolded.*

1 Claim, 5 Drawing Sheets

Figure 2:
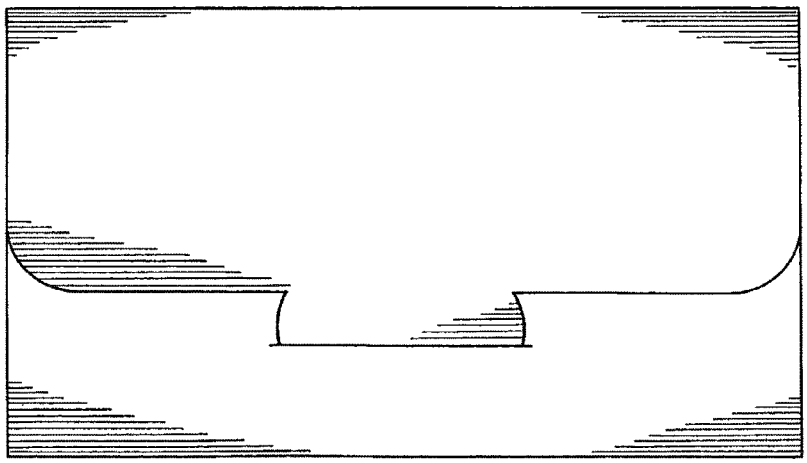
Figure 3:
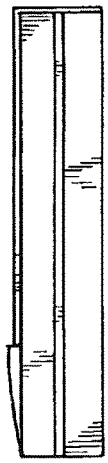
Figure 4:
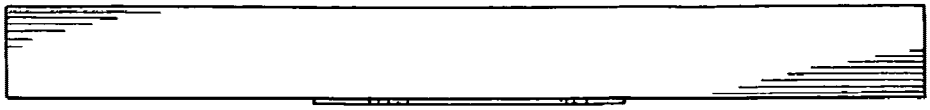
Figure 5:
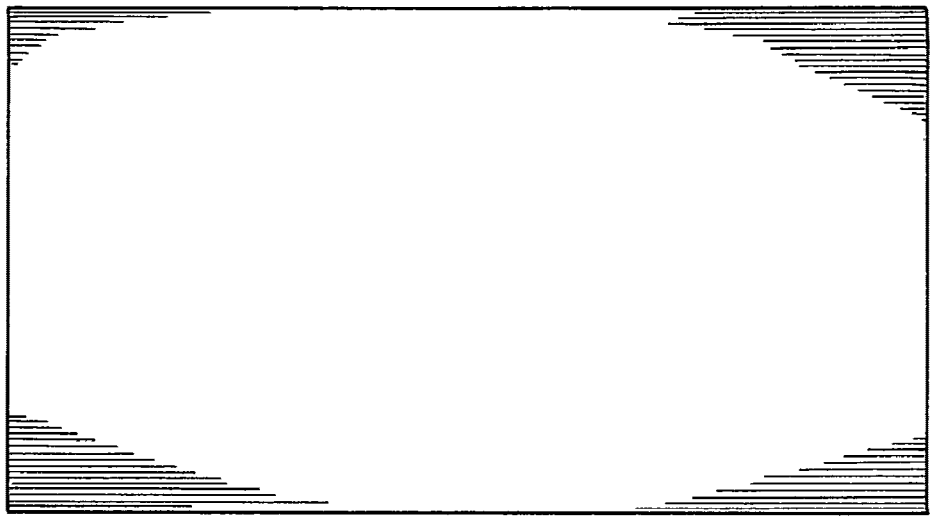
Figure 6:
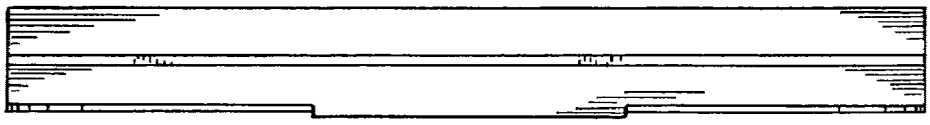

Matter enclosed in heavy brackets [ ] appears in the original patent but forms no part of this reissue; matter printed in italics indicates the additions made by reissue.

(new)

(new)

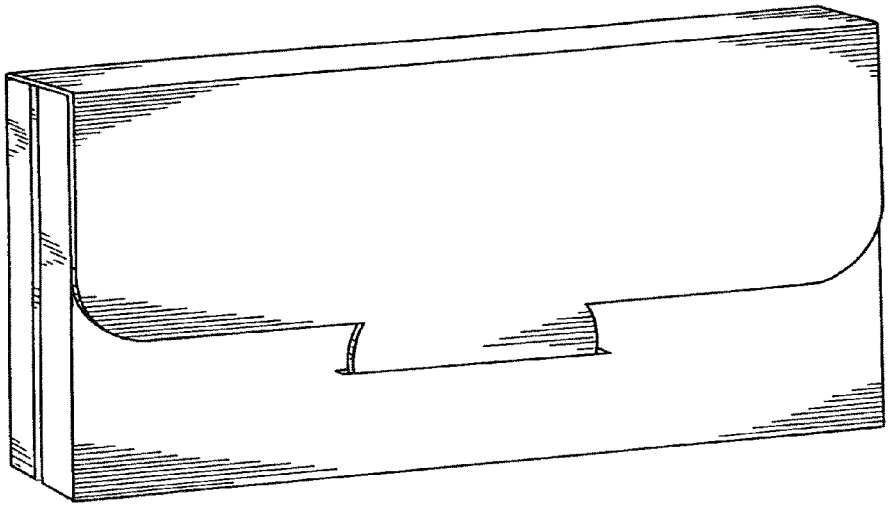
FIG. 1 (Amended)

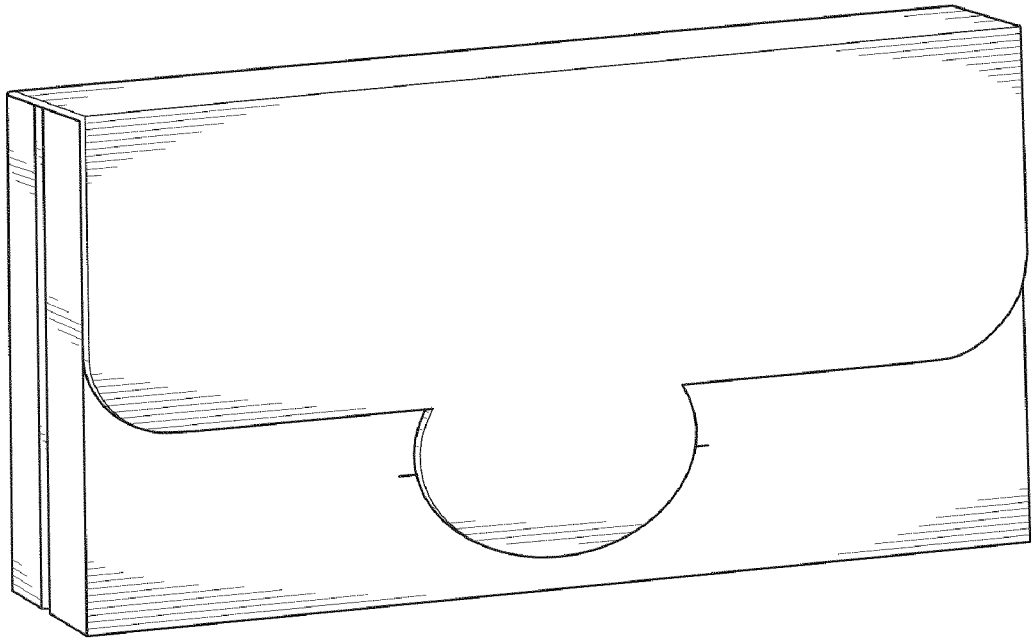
FIG. 7 (new)

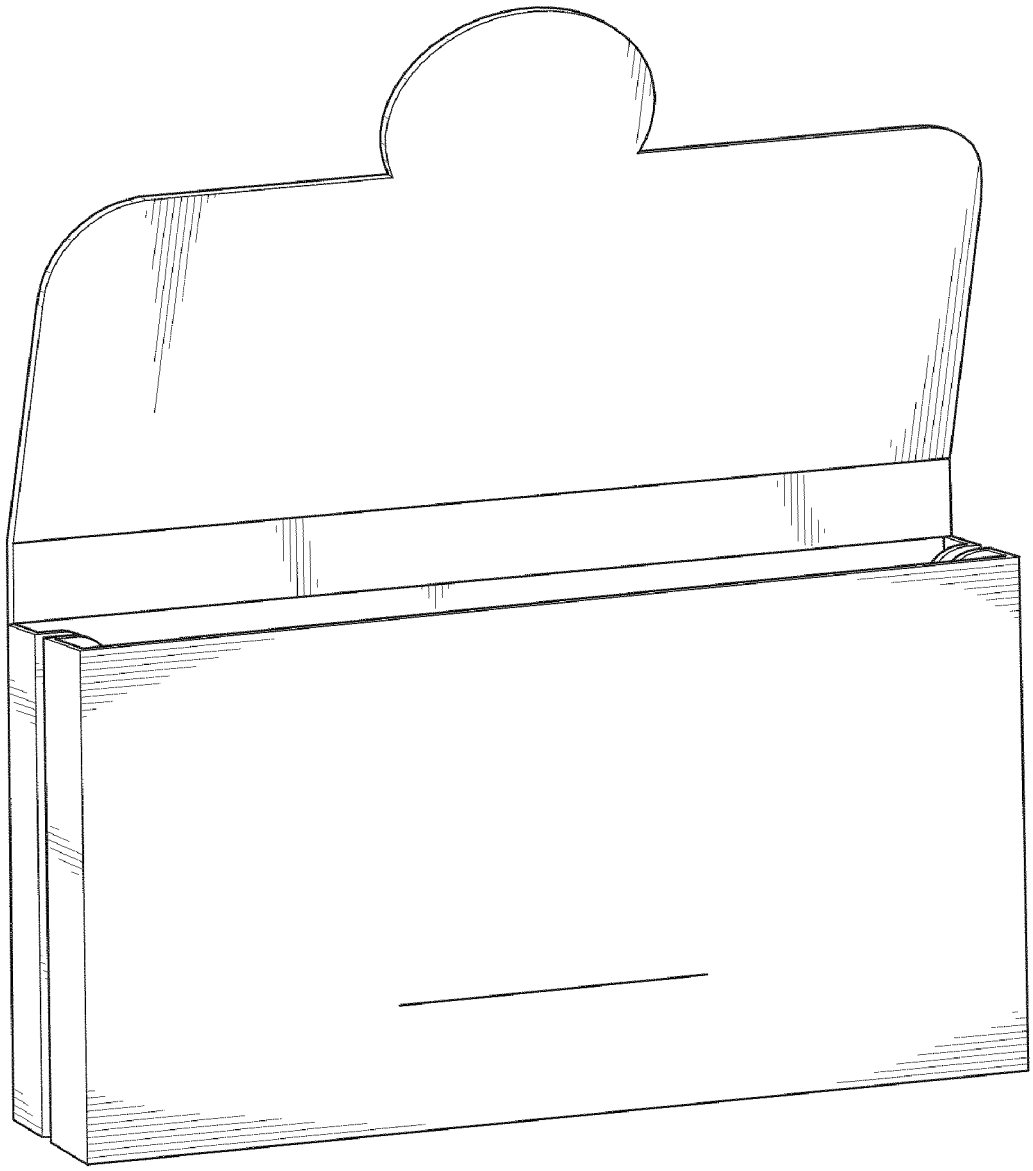
FIG. 8 (new)

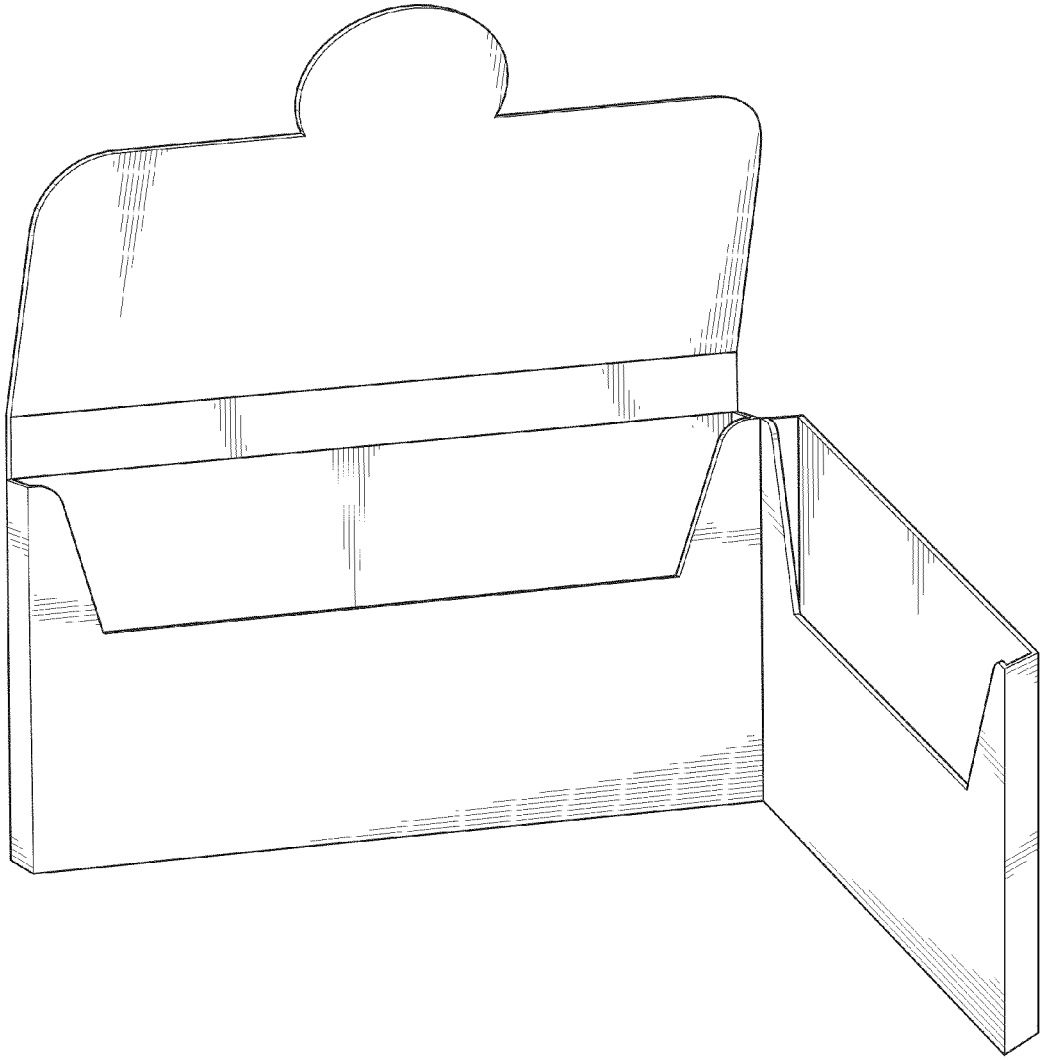
FIG. 9 (new)